United States Patent [19]

Hurtz et al.

[11] Patent Number: 5,170,397
[45] Date of Patent: Dec. 8, 1992

[54] METHOD AND APPARATUS FOR RECOVERING FROM OBJECT FAULTS IN AN ELECTRONIC REPROGRAPHIC PRINTING SYSTEM

[75] Inventors: Robert W. Hurtz, Victor, N.Y.; Kris D. Kirchner, Ontario; Elizabeth A. Bennett, Penfield; John F. Gauronski, Rochester, all of N.Y.

[73] Assignee: Xerox Corporation, Stamford, Conn.

[21] Appl. No.: 589,691

[22] Filed: Sep. 28, 1990

[51] Int. Cl.$^5$ ................. G06F 11/00; G01R 31/28
[52] U.S. Cl. ................. 371/16.4; 355/204; 355/207; 395/575
[58] Field of Search ............. 371/16.4, 16.1; 395/575; 355/204, 205, 206, 207

[56] References Cited

U.S. PATENT DOCUMENTS

| | | | |
|---|---|---|---|
| 4,206,996 | 6/1980 | Clark et al. | 355/14 C |
| 4,327,993 | 5/1982 | Gauronski et al. | 355/14 SH |
| 4,514,846 | 4/1985 | Federico et al. | 371/16.4 |
| 4,521,847 | 6/1985 | Ziehm et al. | 371/16.4 |
| 4,617,661 | 10/1986 | Futaki et al. | 371/16.4 |
| 5,010,551 | 4/1991 | Goldsmith et al. | 371/16.4 |

*Primary Examiner*—Charles E. Atkinson
*Attorney, Agent, or Firm*—Oliff & Berridge

[57] ABSTRACT

A method and apparatus for recovering from faults occurring in an electronic reprographic system capable of processing and printing a multiplicity of jobs is described. The invention provides for the monitoring of the system for the occurrence of faults in a job, interrupting printing of the job upon the occurrence of a fault and determining in which of two fault categories the fault belongs, including an automatic resumption category and a manual resumption category. The invention further provides for automatically resuming the printing of the job without operator intervention in response to clearance of a fault categorized in the automatic resumption category.

8 Claims, 10 Drawing Sheets

METHOD AND APPARATUS FOR RECOVERING FROM OBJECT FAULTS IN AN ELECTRONIC REPROGRAPHIC PRINTING SYSTEM

BACKGROUND OF THE INVENTION

1. Field of the Invention

The present invention relates to a system of electronic reprographics and, more particularly, to a method and apparatus for recovering from faults in an electronic reprographic system.

1. Description of the Related Art

In electronic reprographic printing systems, a complex series of interactions occurs between the software services and objects and the hardware functions to provide the printed or otherwise processed end-product. In such a system, a document or series of documents comprising at least one print job are successively scanned, resulting in image signals which are electronically stored. The signals are later read out successively and transferred to a printer for formation of the images on paper. Such a document can be printed any number of times or processed in any number of ways (e.g., words deleted or added; image magnified or reduced, etc.). If a plurality of documents comprise a job which is being processed, the processing or manipulation of the documents can include deletion of one or more documents, reordering of the documents into a desired order, or addition of a previously or subsequently scanned document or documents. The printing or processing can be relatively synchronous with scanning, or asynchronous after scanning. If asynchronous, a time interval exists between scanning and printing or processing. The system can then accumulate a number of scanned jobs in the system memory for subsequent processing or printing. The order of the jobs to be printed may be different from the order of jobs as scanned, depending on the priority of the jobs and the desires of the operator for increasing productivity or through-put and decreasing printer or scanner down-time.

In such a system, faults can occur on all levels of functioning. Software object faults may occur to result in such problems as illegal job parameters, corrupted data, resource problems, input master errors, font problems, etc. Mechanisms for dealing with such faults are an integral and necessary component of the system, because such faults will result in the interruption of the system, and possibly a crash of the system which requires that the system be rebooted. Information from the system provided to the operator directing the operator to the fault or faults causing the job interruption is critical to the efficient operation of the system.

An important item of information is the nature of the fault which has occurred for the purposes of determining the manner in which cycle-up will take place in the system after recovery from the fault. Certain components of the system have moving parts which could prove unsafe to an operator in close proximity to them while the machine is operating. If the fault has affected such a component, it could be dangerous to an operator to be near the machine if the machine were to cycle up automatically after a fault or a crash.

The related art disclosed in U.S. Pat. No. 4,327,993 to Gauronski, the disclosure of which is herein incorporated by reference, reveals a printing system which provides for a job recovery system for a reproduction machine. The system permits either a manual or an automatic cycle-up procedure depending on the clearance procedures required. Various machine malfunctions require different degrees of operator intervention and job recovery. For example, the system will automatically resume operation after recovery from such faults as the top tray being full, a tray being empty, or the stacker requiring unloading.

While the related art provides for a job recovery system, it fails to disclose a system whereby the system evaluates the potential danger to the operator in the event of an automatic cycle-up after recovery from a fault. It is desirable to devise a system that will cycle-up as soon as possible after a fault or a crash in order to maximize the efficiency of the system. It is equally desirable to insure that the potential for any danger to the operator during cycle-up is minimized.

OBJECTS AND SUMMARY OF THE INVENTION

Accordingly, one object of the present invention is to provide an electronic reprographic system which monitors the faults and statuses within the system, and evaluates such faults with respect to the proximity to moving parts required of the operator in the course of recovering from the fault.

Another object of the present invention is to provide an electronic reprographic system wherein a fault not requiring proximity to moving parts on the part of the operator will permit an automatic cycle-up after recovery from a fault.

Still another object of the present invention is to provide an electronic reprographic system wherein a fault requiring proximity to moving parts on the part of the operator will require an operator-initiated cycle-up during recovery.

To achieve the foregoing and other objects, and to overcome the shortcomings discussed above, an electronic reprographic system is provided which monitors the system for the occurrence of faults, categorizes the fault detected into one of two fault categories, wherein an automatic cycle-up mechanism is provided for faults categorized as not requiring physical proximity of the operator to moving parts during recovery. This invention further provides for an operator-initiated cycle-up mechanism for faults categorized as requiring physical proximity of the operator to moving parts during recovery.

BRIEF DESCRIPTION OF THE DRAWINGS

The invention will be described in detail with reference to the following drawings in which like reference numerals refer to like elements and wherein.

DETAILED DESCRIPTION OF THE PREFERRED EMBODIMENTS

A. The System

Figure 1:
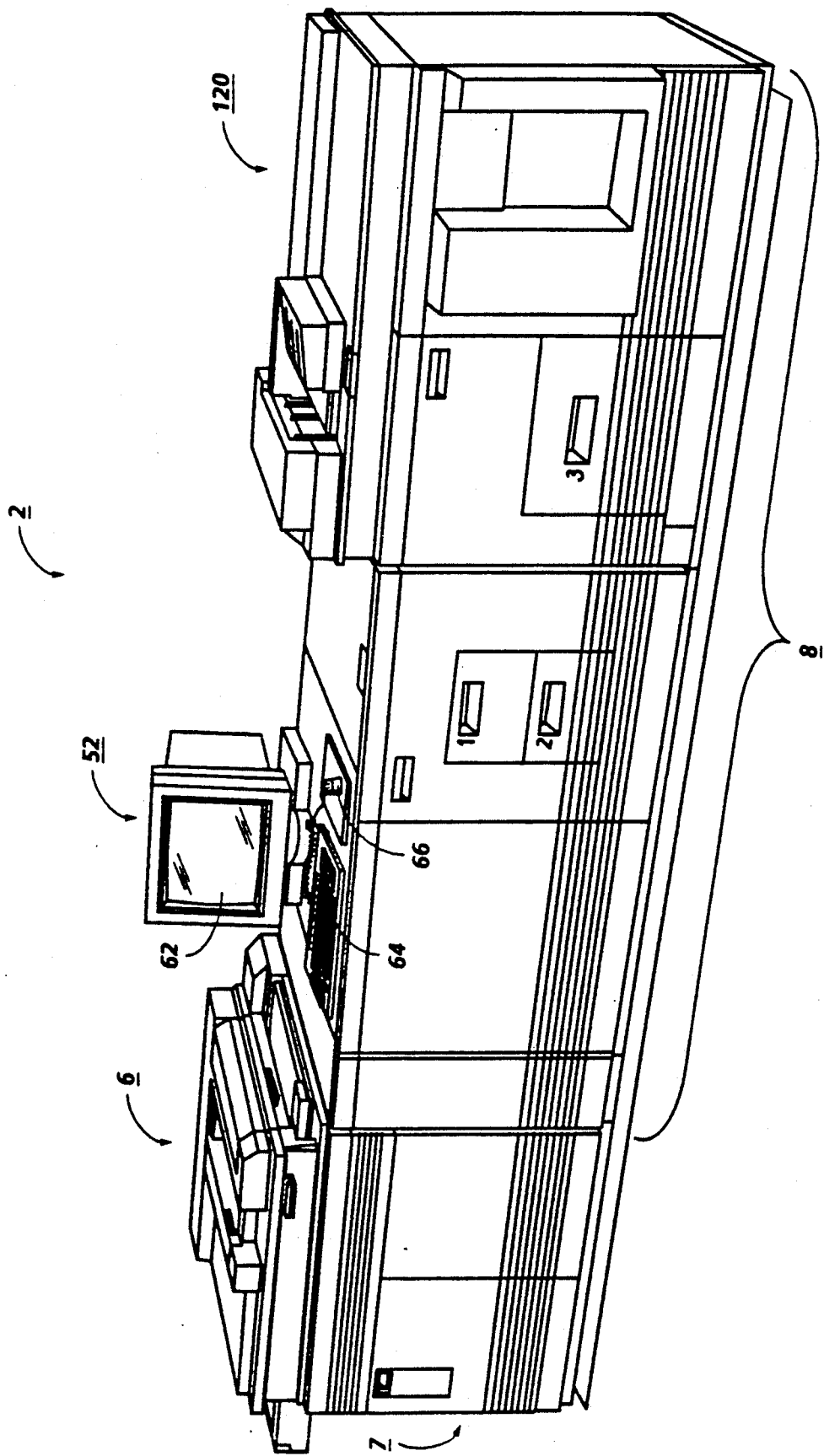
FIG. 1 is a view depicting an electronic printing system incorporating the print media identification system of the present invention.
Figure 2:
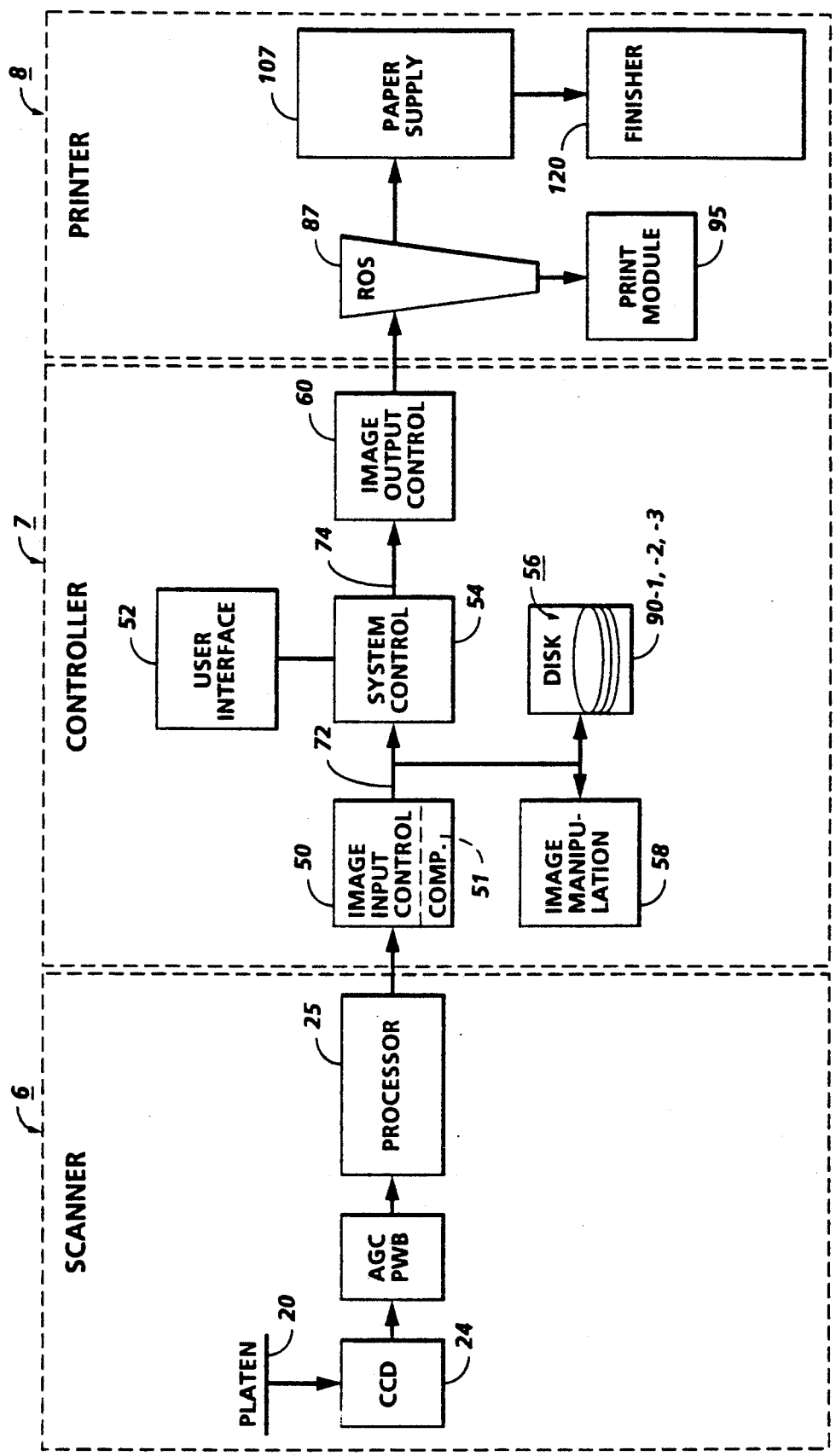
FIG. 2 is a block diagram depicting the major elements of the ,printing system shown in FIG. 1.

Referring now to the drawings, and particularly to FIGS. 1 and 2 thereof, there is shown an exemplary laser based printing system 2 for processing print jobs in accordance with the teachings of the present invention. Printing system 2, for purposes of explanation, is divided into a scanner section 6, controller section 7, and printer section 8. While a specific printing system is shown and described, the present invention may be used with other types of printing systems such as ink jet, ionographic, etc.

Figure 3:
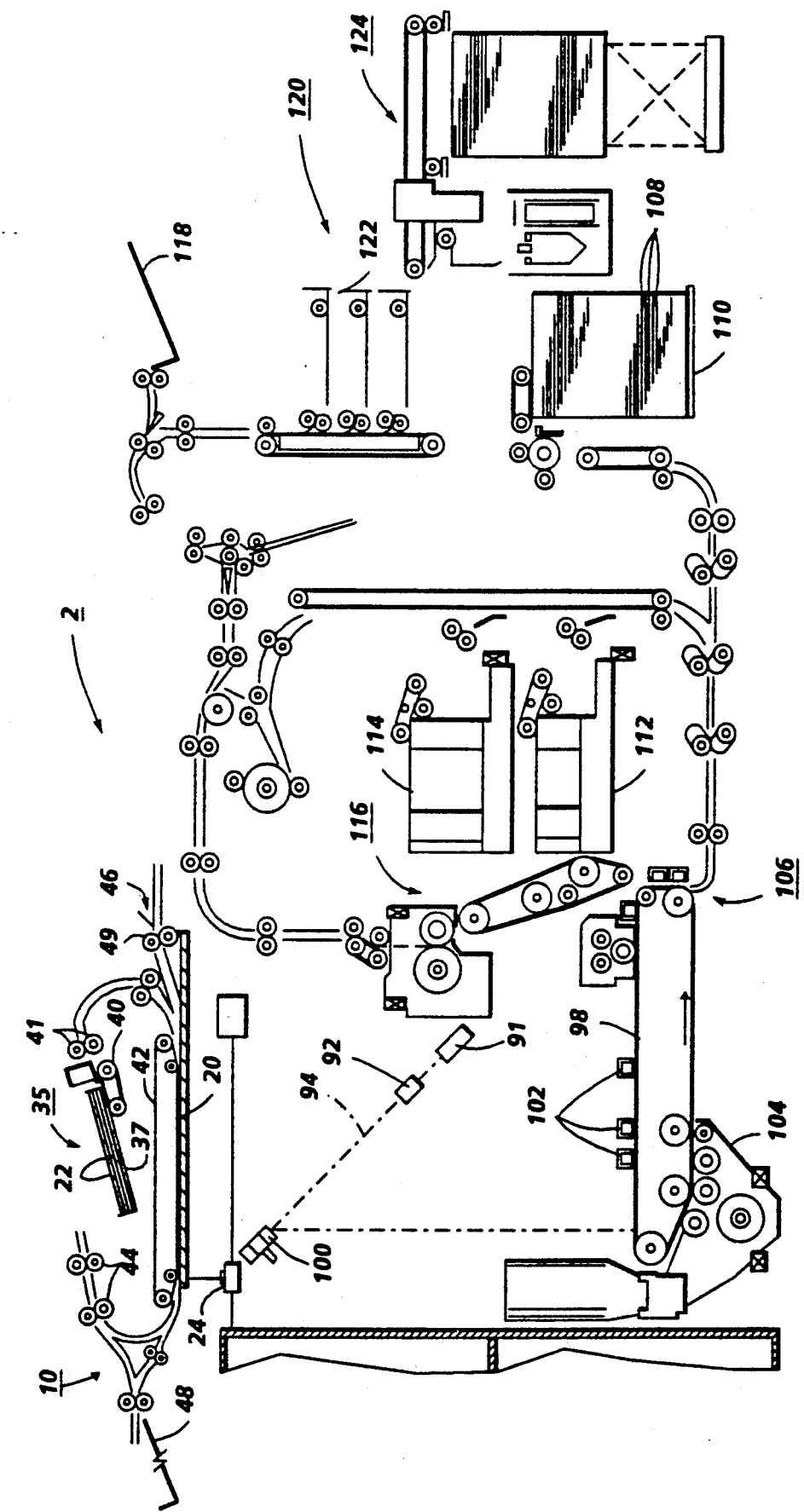
FIG. 3 is a plan view illustrating the principal mechanical components of the printing system shown in FIG. 1.
Figure 4:
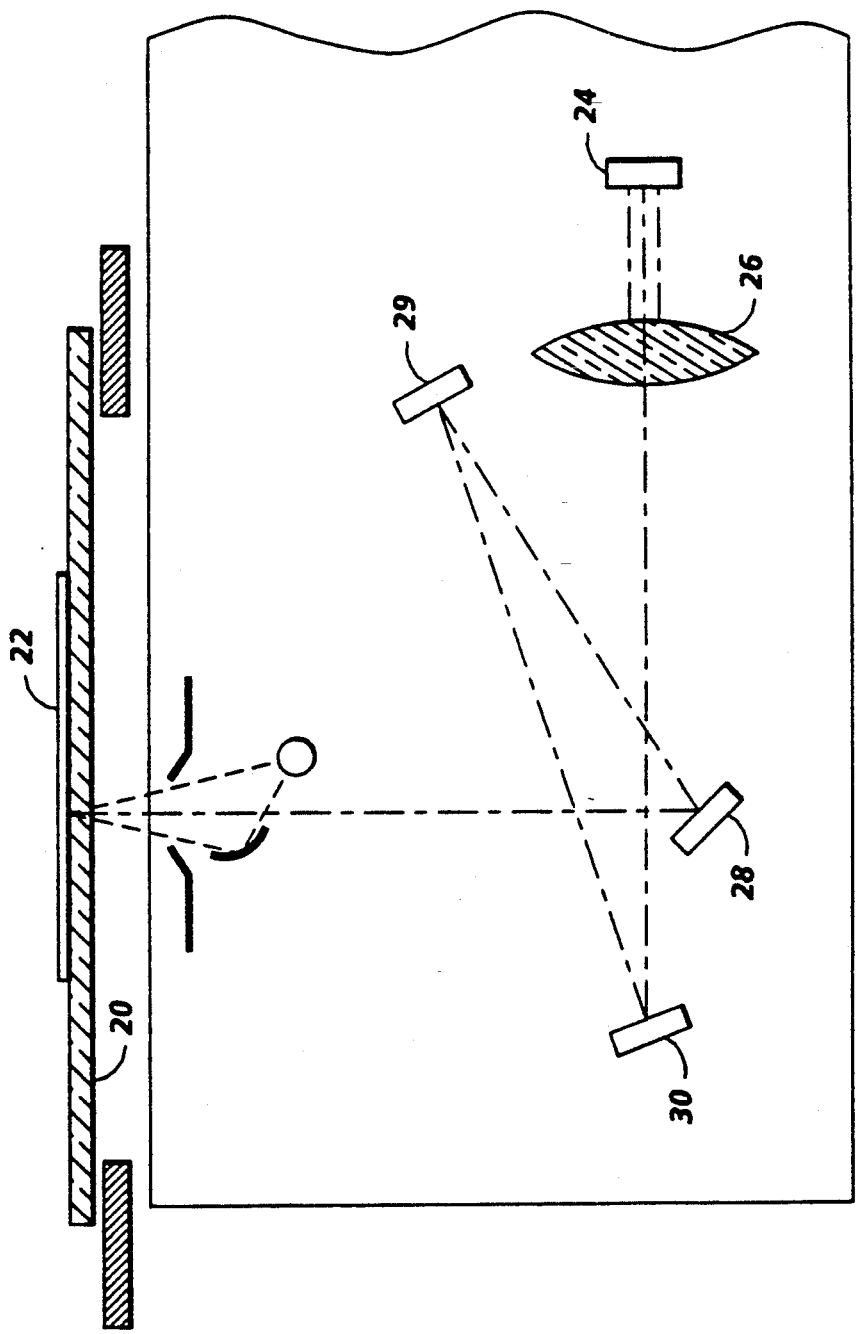
FIG. 4 is a schematic view showing certain construction details of the document scanner for the printing system shown in FIG. 1.

Referring particularly to FIGS. 2–4, scanner section 6 incorporates a transparent platen 20 on which the document 22 to be scanned is located. One or more linear arrays 24 are supported for reciprocating scanning movement below platen 20. Lens 26 and mirrors 28, 29, 30 cooperate to focus array 24 on a line-like segment of platen 2 and the document being scanned thereon. Array 24 provides image signals or pixels representative of the image scanned which, after suitable processing by processor 25, are output to controller section 7.

Processor 25 converts the analog image signals output by array 24 to digital and processes the image signals as required to enable system 2 to store and handle the image data in the form required to carry out the job programmed. Processor 25 also provides enhancements and changes to the image signals such as filtering, thresholding, screening, cropping, reduction/enlarging, etc. Following any changes and adjustments in the job program, the document must be rescanned.

Documents 22 to be scanned may be located on platen 20 for scanning by automatic document handler (ADF) 35 operable in either a Recirculating Document Handling (RDH) mode or a Semi-Automatic Document Handling (SADH) mode. A manual mode including a Book mode and a Computer Forms Feeder (CFF) mode are also provided, the latter to accommodate documents in the form of computer fanfold. For RDH mode operation, document handler 35 has a document tray 37 in which documents 22 are arranged in stacks or batches. The documents 22 in tray 37 are advanced by vacuum feed belt 40, document feed rolls 41 and document feed belt 42 onto platen 20 where the document is scanned by array 24. Following scanning, the document is removed from platen 20 by belt 42 and returned to tray 37 by document feed rolls 44.

For operation in the SADH mode, a document entry slot 46 provides access to the document feed belt 42 between tray 37 and platen 20 through which individual documents may be inserted manually for transport to platen 20. Feed rolls 49 behind slot 46 form a nip for engaging and feeding the document to feed belt 42 and onto platen 20. Following scanning, the document is removed from platen 20 and discharged into catch tray 48.

For operation in the CFF mode, computer forms material is fed through slot 46 and advanced by feed rolls 49 to document feed belt 42 which in turn advances a page of the fanfold material into position on platen 20.

Referring to FIGS. 2 and 3, printer section 8 comprises a laser type printer and, for purposes of explanation, is separated into a Raster Output Scanner (ROS) section 87, Print Module Section 95, Paper Supply section 107, and Finisher 120. ROS 87 has a laser 90, the beam of which is split into two imaging beams 94. Each beam 94 is modulated in accordance with the content of an image signal input by acousto-optic modulator 92 to provide dual imaging beams 94. Beams 94 are scanned across a moving photoreceptor 98 of Print Module 95 by the mirrored facets of a rotating polygon 100 to expose two image lines on photoreceptor 98 with each scan and create the latent electrostatic images represented by the image signal input to modulator 92. Photoreceptor 98 is uniformly charged by corotrons 102 at a charging station preparatory to exposure by imaging beams 94. The latent electrostatic images are developed by developer 104 and transferred at transfer station 106 to a print media 108 delivered by Paper Supply section 107. Media 108 as will appear may comprise any of a variety of sheet sizes, types, and colors. For transfer, the print media is brought forward in timed registration with the developed image on photoreceptor 98 from either a main Paper tray 110 or from auxiliary Paper trays 112, or 114. The developed image transferred to the print media 108 is permanently fixed or fused by fuser 116 and the resulting prints discharged to either output tray 118, or to finisher 120. Finisher 120 includes a stitcher 122 for stitching or stapling the prints together to form books and a thermal binder 124 for adhesively binding the prints into books.

Referring to FIGS. 2 and 5, controller section 7 is, for explanation purposes, divided into an image input controller 50, User Interface (UI) 52, system controller 54, main memory 56, image manipulation section 58, and image output controller 60.

Figure 5A:
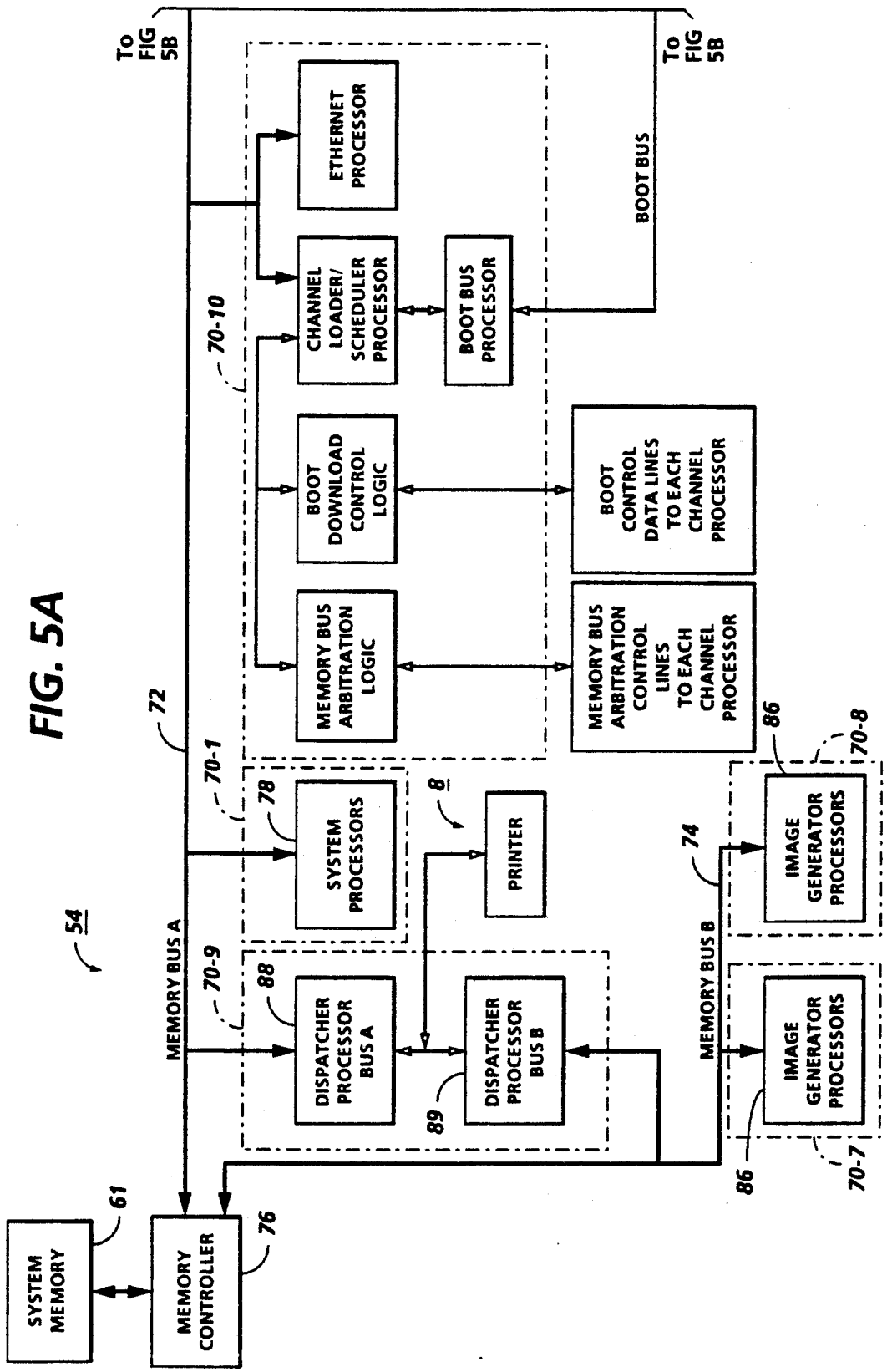
FIGS. 5A, 5B, and 5C comprise a schematic block diagram showing the major parts of the control section for the printing system shown in FIG. 1.
Figure 5B:
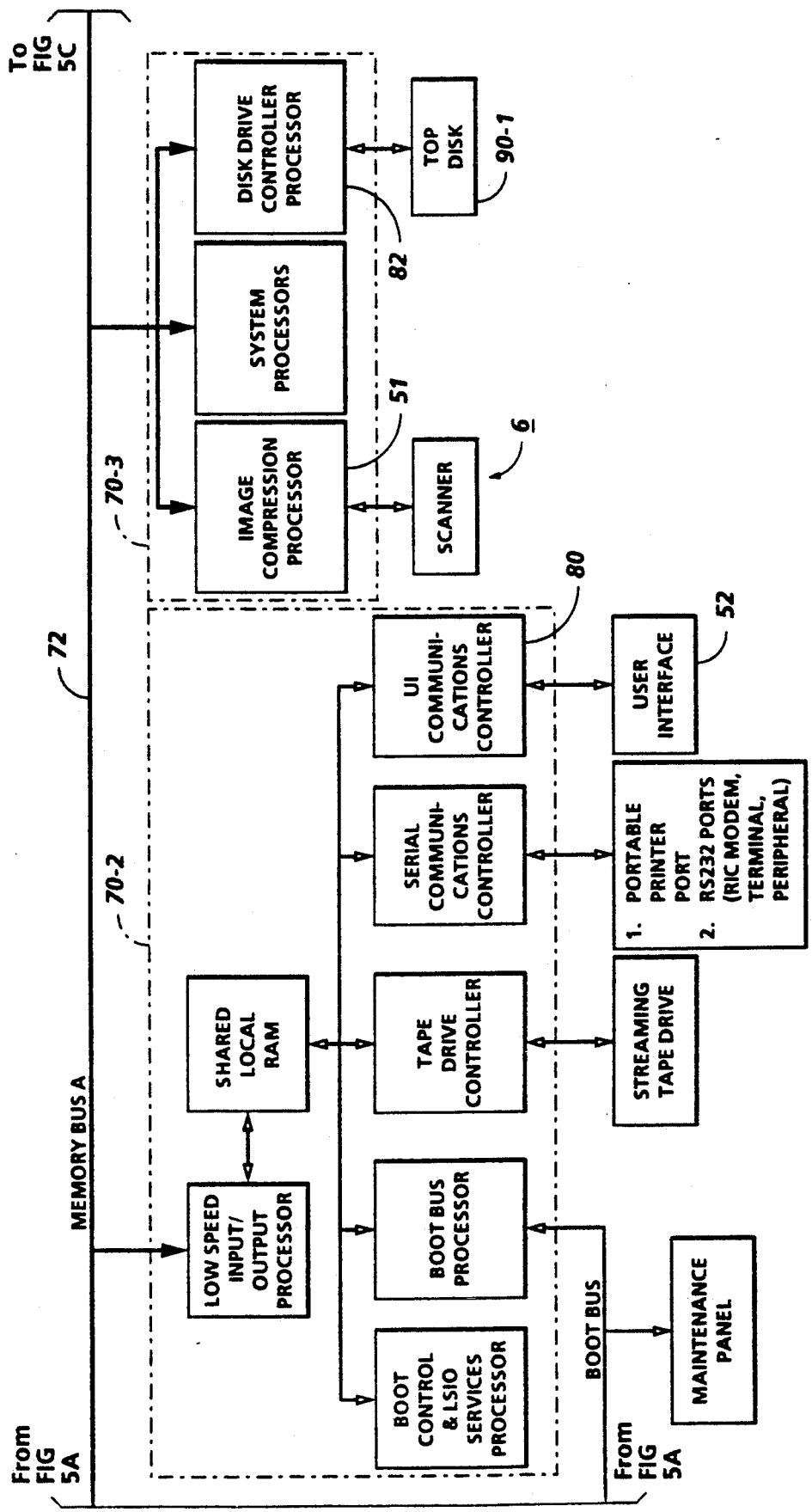
Figure 5C:
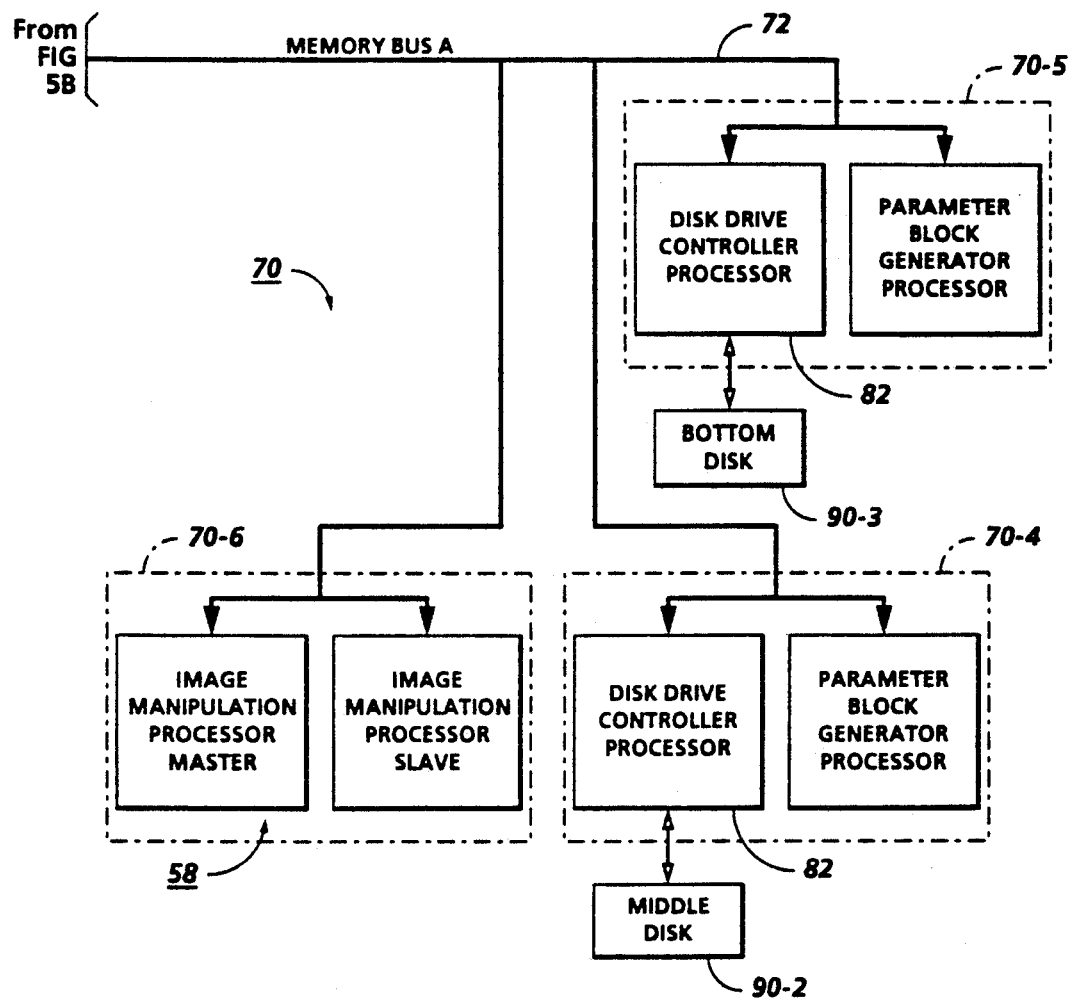

Referring particularly to FIGS. 5A–5C, control section 7 includes a plurality of Printed Wiring Boards (PWB's) 70, PWB's 70 being coupled with one another and with System Memory 61 by a pair of memory buses 72,74. Memory controller 76 couples System Memory 61 with buses 72, 74. PWB's 70 include system processor PWB 70-1 having plural system processors 78; low speed I/O processor PWB 70-2 having UI communication controller 80 for transmitting data to and from UI 52; PWB's 70-3, 70-4 and 70-5 having disk drive controller/processors 82 for transmitting data to and from disks 90-1, 90-2 and 90-3, respectively, of main memory 56 (image compressor/processor 51 for compressing the image data is on PWB 70-3); image manipulation PWB 70-6 with image manipulation processors of image manipulation section 58; image generation processor PWB's 70-7 and 70-8 with image generation processor 86 for processing the image data for printing by printer section 8; dispatch processor PWB 70-9 having dispatch processors 88 and 89 for controlling transmission of data to and from printer section 8; and boot control-arbitration-scheduler PWB 70-10.

The scanned image data input from processor 25 of scanner section 6 to controller section 7 is compressed by image compressor/processor 51 of image input controller 50 on PWB 70-3. As the image data passes through compressor/processor 51, it is segmented into slices N scanlines wide, each slice having a slice pointer. The compressed image data together with slice pointers and any related image descriptors providing image specific information (such as height and width of the document in pixels, the compression method used, pointers to the compressed image data, and pointers to the image slice pointers) are placed in an image file. The image files, which represent different print jobs, are temporarily stored in system memory 61 which comprises a Random Access Memory or RAM pending transfer to main memory 56 where the data is held pending use.

As best seen in FIG. 1, UI 52 includes a combined operator controller/CRT display consisting of an interactive touchscreen 62, keyboard 64, and mouse 66. UI 52 interfaces the operator with printing system 2, enabling the operator to program print jobs and other instructions, to obtain system operating information, instructions, programming information, diagnostic information, etc. Items displayed on touchscreen 62 such as files and icons are actuated by either touching the displayed item on screen 62 with a finger or by using mouse 66 to point cursor 67 to the item selected and keying the mouse.

Main memory 56 has plural hard disks 90-1, 90-2, 90-3 for storing machine Operating System software, machine operating data, and the scanned image data currently being processed.

When the compressed image data in main memory 56 requires further processing, or is required for display on touchscreen 62 of UI 52, or is required by printer section 8, the data is accessed in main memory 56. Where further processing other than that provided by processor 25 is required, the data is transferred to image manipulation section 58 on PWB 70-6 where the additional processing steps such as collation, make ready, decomposition, etc., are carried out. Following processing, the data may be returned to main memory 56, sent to UI 52 for display on touchscreen 62, or sent to image output controller 60.

Image data output to image output controller 60 is decompressed and readied for printing by image generating processors 86 of PWB's 70-7, 70-8 (seen in FIG. 5A). Following this, the data is output by dispatch processors 88, 89 on PWB 70-9 to printer section 8. Image data sent to printer section 8 for printing is normally purged from memory 56 to make room for new image data.

Figure 6:
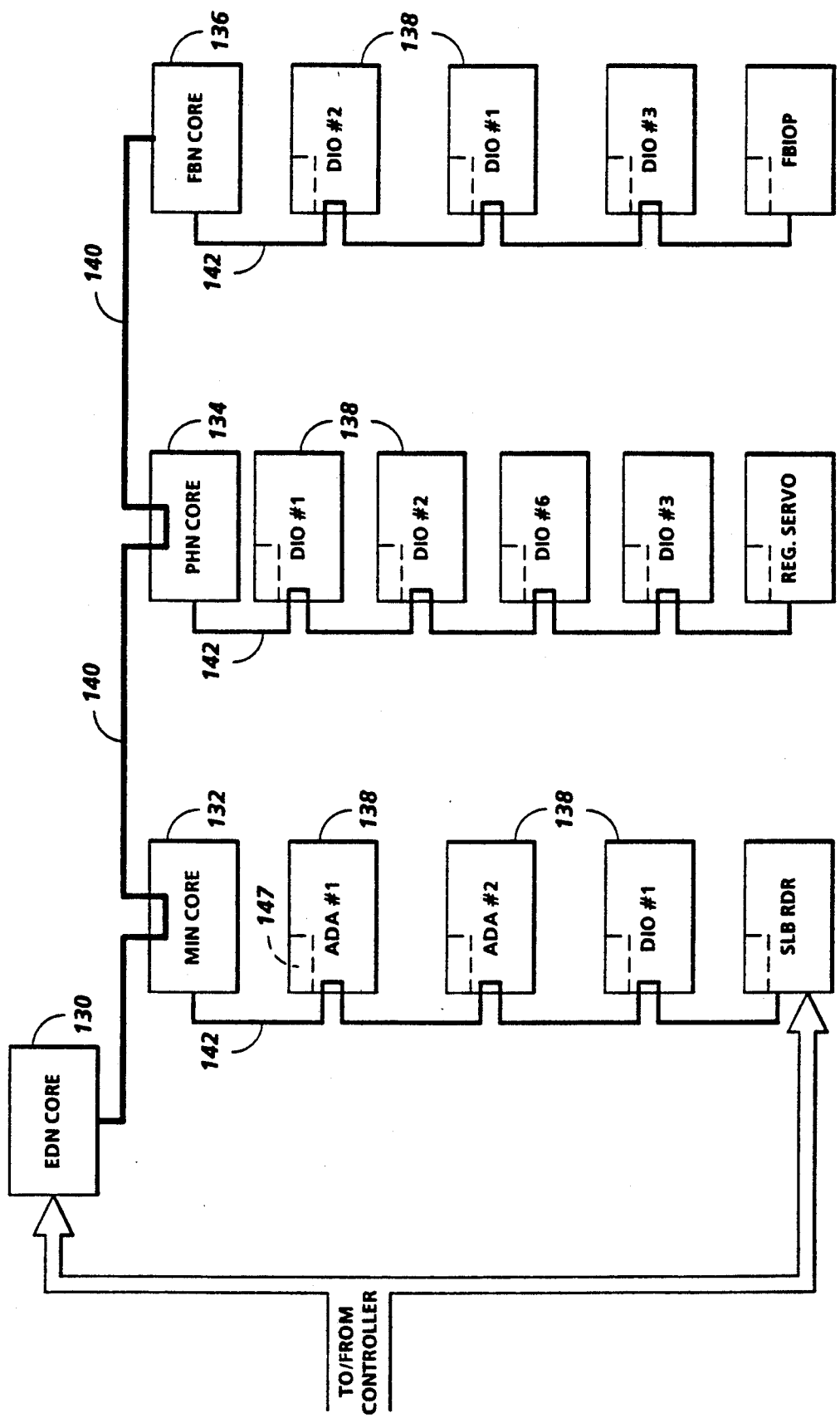
FIG. 6 is a block diagram of an Operating System, together with Printed Wiring Boards and shared line connections for the printing system shown in FIG. 1.

Referring particularly to FIG. 6, system control signals are distributed via a plurality of printed wiring boards (PWB's). These include EDN core PWB 130, Marking Imaging core PWB 132, Paper Handling core PWB 134, and Finisher Binder core PWB 136 together with various Input/Output (I/O) PWB's 138. A system bus 140 couples the core PWB's 130, 132, 134 and 136 with each other and with controller section 7 while local buses 142 serve to couple the I/O PWB's 138 with each other and with their associated core PWB.

On machine power up, the Operating System software is loaded from memory 56 to EDN core PWB 130 and from there to the remaining core PWB's 132, 134 and 136 via bus 140, each core PWB 130, 132, 134, 136 having a boot ROM (not shown) for controlling downloading of Operating System software to the PWB, fault detection, etc. Boot ROMs also enable transmission of Operating System software and control data to and from PWB's 130, 132, 134 and 136 via bus 140 and control data to and from I/O PWB's 138 via local buses 142. Additional ROM, RAM, and NVM memory types are resident at various locations within system 2.

Figure 7:
FIG. 7 is a view depicting an exemplary job programming ticket and job scorecard displayed on the User Interface (UI) touchscreen of the printing system shown in FIG. 1.

Referring to FIG. 7, jobs are programmed in a Job Program mode in which there is displayed on touchscreen 62 a Job Ticket 150 and a Job Scorecard 152 for the job being programmed. Job Ticket 150 displays various job selections programmed while Job Scorecard 152 displays the basic instructions to the system for printing the job.

B. Cycle-up After Fault

A fault or crash is an unpredictable condition in any part of the system 2 which causes a subset of the system elements to become unavailable to the operator. Some examples are:

At the system level: Where a reboot (restart of the system after a crash which could be initiated by the system or through an operator intervention at UI 52) or a repowering (initiated by an operator only, but could include a loss of power) occurs.

At the system element level: Where the system attempts to recover automatically by reinitializing or resoftloading the system element. Additionally, during certain fault recovery procedures, the operator may cause the system to reinitialize or resoftload the system elements to achieve recovery.

At the hardware level: When the system hardware becomes inoperative.

When a rebooting of the system 2 is required, this process begins with a reinitialization of the controller 7. The peripheral components of the system 2, i.e., the scanner 6, user interface 52, and printer 8, are then repowered. A Crash Recovery Synchronization next occurs to ensure that the peripheral components and the controller 7 enter their functional state in synchrony. When the controller 7 is informed by the system 2 that all faults are cleared and that the peripheral components of the system 2 are prepared to function, the controller 7 issues a cycle-up request to the printer 8, which is communicated to the operator through the UI 52 as a "Resume Printer" icon.

Thus, the system includes a crash recovery operation invisible to the operator which returns the system elements to a functional state after a crash has occurred. During this recovery, the initial cause of the crash (i.e., the fault) must be cleared. Whenever possible, the first attempt at recovery will be automatic, with no operator intervention, and without impact to the other system elements. If assistance is required, it will be at the operator level. If a hardware failure is detected during the system self-test, a fault code will be displayed at UI 52 to alert the operator that a service call is in order.

Categories of crashes which occur in system 2 include:

1) those that the operator can perceive, but are automatically recoverable;
2) those which cause the system to automatically recover to a certain level, but which also require the operator to assist in order to finish recovery; and
3) those in which the system cannot automatically recover, and which require the operator to initiate the process of recovery (e.g., booting, cycling power).

If a fault occurs in a software object (i.e., jobs, merge items), the object is marked as faulted when the problem is detected, and information necessary for operator clearance is added to the object. Examples of faults which may occur in the system include:

Illegal job parameters (e.g., a specification of binding for a one page job)

Corrupted data (e.g., an image on a job page is bad)

Resource problems (e.g., a job page is too complex to print)

IP master errors (e.g., an incoming net job has problems in the master)

Font problems (e.g., a font needed by a job is not currently loaded)

During the operation of the system 2, the state of the printer 8 is monitored by the controller 7, which distinguishes between a "Ready" and a "Not Ready" printer state. When a fault occurs, the printer state goes to "Not Ready"; when the fault is cleared, the printer state returns to "Ready". The system 2 automatically aborts all services which are actively working on the object. For example, if a job is stream printing, (i.e., printing a portion of a job while scanning another portion of the same job), and scan detects the problem, printing is stopped also.

During operation of the system 2, the controller 7 also monitors the faults and statuses passing from the image output controller 60 to the user interface UI 52. When performing this function, the controller section 7 categorizes the faults processed into one of two image output controller 60 fault categories: one that requires an operator-initiated cycle-up, and the other permitting an automatic cycle-up. The system then proceeds with the proper cycle-up action accordingly when the recovery from the fault has been completed by the operator and the controller section 7 is ready to continue processing its jobs.

A conditional image output controller 60 cycle-up mechanism is found with the controller section 7 which allows for an operator-initiated cycle-up of the system in the event that a fault will require the operator to open and close covers and doors which provide access to moving parts. For example, such components of the machine as the binder 124 and the finisher 120, are areas within the system 2 would could be potentially dangerous if exposed to the operator during operation of the machine. Furthermore, a duplex inverter jam, a bindexer jam and a fuser jam all involve components of the machine which require operator-initiated manual cycle-up.

An automatic cycle-up of the system is available to the operator, however, when a fault occurs which does not involve moving parts of components of the system 2.

After clearance of the fault, during the transition of the printer state to "Ready", the controller 7 checks if all faults processed in the "Not Ready" state fell into the automatic recovery category. If they are, the controller 7 automatically initiates a cycle-up of the printer 8. If they are not, the controller 7 through a manual recovery frame on UI 52 notifies the operator that manual recovery is required, and then waits until such action is initiated by the operator. Significant system operability and productivity gains are realized by having the controller 7 initiate a cycle-up of the image output controller 60 as soon as it detects that the fault's recovery has been completed by the operator. For example, such faults as the top tray being full, a tray being empty, or the stacker requiring unloading are faults wherein recovery can be automatic when the system 2 detects that such fault has been corrected.

Figure 8:
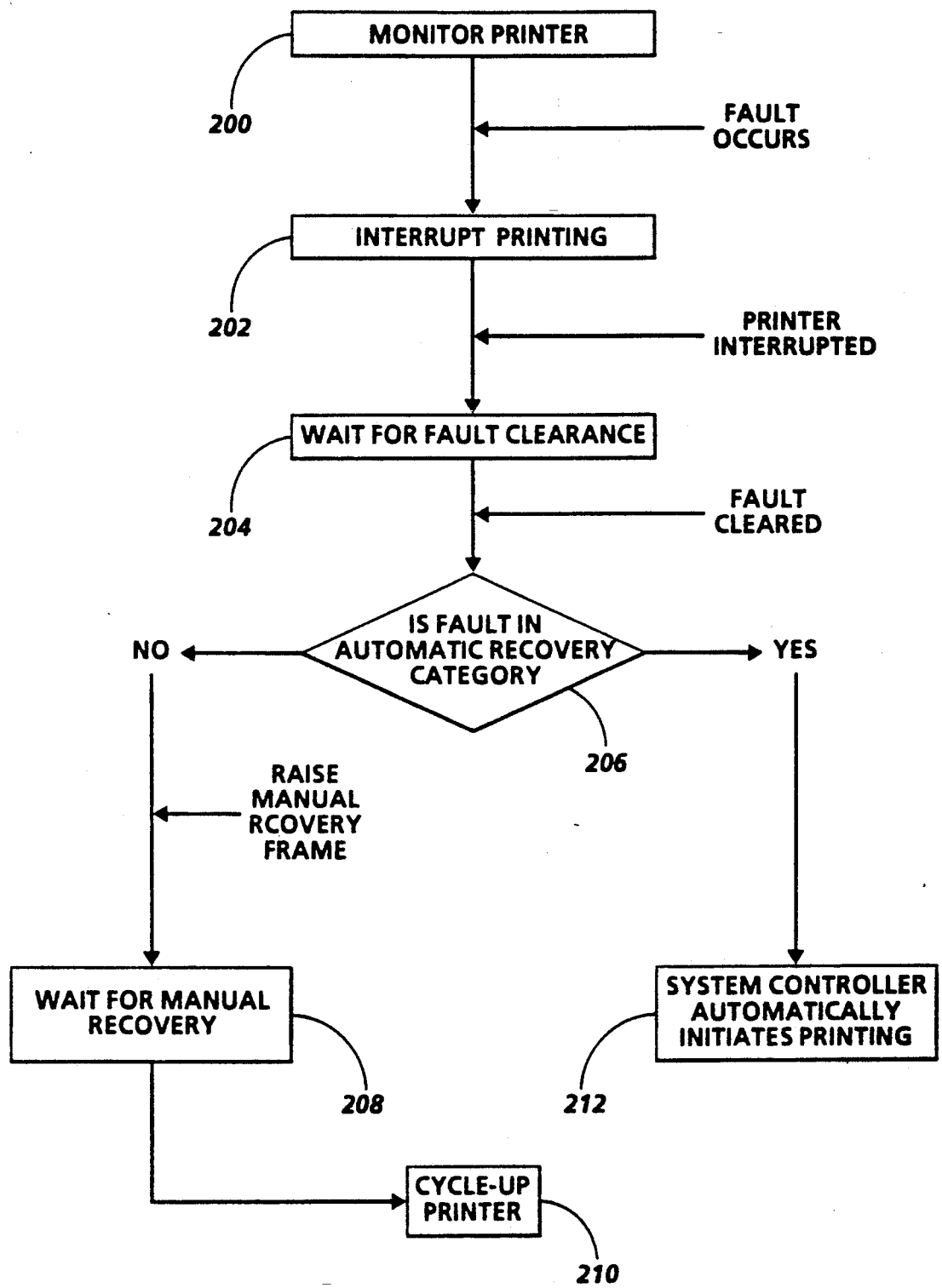
FIGS. 8 is flowchart depicting the operation of the FIG. 1 system during recovery from faults in the system.

The invention is summarized in FIG. 8. FIG. 8 depicts the operation of system 2 wherein the controller 7 monitors the data being transmitted from the image output controller 60 to the user interface 52 regarding the faults and statuses within the printer (Step 200). The controller continuously evaluates this data and, in the event of the discovery of a fault requiring the printing to be interrupted, the controller interrupts the printer 7 (Step 202), at which point the printer 8 goes from a "Ready" to a "Not Ready" printed state. The printer remains in this state until the fault is cleared (Step 204). Upon notification that the fault is cleared, the controller processes the fault within its data base and places the fault in one of two categories (Step 206). If the fault is placed in the automatic recovery category, i.e., no exposure to moving parts of the system on the part of the operator, the system proceeds to instruct the printer to cycle-up without any further intervention by the operator (Step 212). In the event that the fault is not placed in the automatic recovery category, the system will not permit the printer to cycle-up without further intervention by the operator, and waits for the operator to manually direct the printer 8 recommence printing (Step 208). This results in the controller issuing a request to cycle-up to the printer 8 (Step 210).

While this invention has been described in conjunction with specific embodiments thereof, it is evident that many alternatives, modifications and variations will be apparent to those skilled in the art. Accordingly, the preferred embodiments of the invention as set forth herein are intended to be illustrative, not limiting. Various changes may be made without departing from the spirit and scope of the invention as defined in the following claims.

What is claimed is:

1. A method for recovering from faults occurring in an electronic reprographic system capable of processing and printing a multiplicity of jobs, comprising the steps of:

monitoring the system for the occurrence of at least one fault in a job;

interrupting printing of said job upon the occurrence of a fault;

determining in which of two fault categories said fault belongs, said fault categories including an automatic resumption category and a manual resumption category;

automatically resuming the printing of said job without any manual operator intervention in response to clearance of a fault categorized in the automatic resumption category.

2. The method as recited in claim 1, wherein the step of determining in which of two fault categories said fault belongs includes the determination of whether the clearance of the fault by the operator requires the operator to be in close proximity to any hazardous parts of the system.

3. A method for recovering from faults occurring in an electronic reprographic system capable of processing and printing a multiplicity of jobs, comprising the steps of:

monitoring the system for the occurrence of at least one fault in a job;

interrupting printing of said job upon the occurrence of a fault;

determining in which of two fault categories said fault belongs, said fault categories including an automatic resumption category and a manual resumption category;

automatically resuming the printing of said job without any manual operator intervention in response to clearance of a fault categorized in the automatic resumption category; and wherein the step of determining in which of two fault categories said fault belongs includes a determination of whether the clearance of the fault by the operator requires the operator to be in close proximity to any moving parts of the system.

4. The method as recited in claim 1, further comprising the step of resuming printing of said job manually upon the initiation of the operator in response to a fault in said manual resumption category.

5. An apparatus for operating an electronic reprographic system, comprising:
   means for monitoring the system to determine an occurrence of a fault;
   means for interrupting printing of said job upon occurrence of a fault;
   means for determining in which of two fault categories said fault belongs, said fault categories including an automatic resumption category and a manual resumption category; and
   means for automatically resuming the printing of said job without any manual operator intervention in response to clearance of a fault categorized in the automatic resumption category.

6. The apparatus as recited in claim 5, further comprising means for resuming printing of said job manually upon the initiation of the operator in response to a fault in said manual resumption category.

7. The apparatus as recited in claim 5, wherein the means for determining in which two fault categories said fault belongs includes means for determining whether the clearance of the fault by the operator requires the operator to be in close proximity to any hazardous parts of the system.

8. An apparatus for operating an electronic reprographic system, comprising:
   means for monitoring the system to determine an occurrence of a fault;
   means for interrupting printing of said job upon occurrence of a fault;
   means for determining in which of two fault categories said fault belongs, said fault categories including an automatic resumption category and a manual resumption category;
   means for automatically resuming the printing of said job without any manual operator intervention in response to clearance of a fault categorized in the automatic resumption category; and
   wherein the means for determining in which of two fault categories said fault belongs includes means for determining whether the clearance of the fault by the operator requires the operator to be in close proximity to any moving parts of the system.

* * * * *